(12) United States Patent
Scalf et al.

(10) Patent No.: US 8,905,895 B2
(45) Date of Patent: Dec. 9, 2014

(54) ELECTRIC MOTOR TORQUE TRANSFER DEVICE AND SENSOR

(75) Inventors: Gerald W. Scalf, Houston, TX (US); Doyle R. Blume, Jr., La Porte, TX (US)

(73) Assignee: Emerson Process Management Value Automation, Inc., St. Louis, MO (US)

( * ) Notice: Subject to any disclaimer, the term of this patent is extended or adjusted under 35 U.S.C. 154(b) by 180 days.

(21) Appl. No.: 13/517,843

(22) Filed: Jun. 14, 2012

(65) Prior Publication Data
US 2013/0337958 A1    Dec. 19, 2013

(51) Int. Cl.
*F16H 1/12* (2006.01)
*F16H 57/02* (2012.01)

(52) U.S. Cl.
USPC ........................................ 475/343; 74/606 R (58) Field of Classification Search
USPC ................ 475/149, 207, 343; 74/416, 606 R; 73/862.381, 862.451, 862.471, 73/862.473
See application file for complete search history.

(56) References Cited

U.S. PATENT DOCUMENTS

| | | |
|---|---|---|
| 4,614,134 A | 9/1986 | Bohle |
| 4,909,527 A * | 3/1990 | Hosotani ......................... 280/88 |
| 5,527,194 A * | 6/1996 | Strong et al. ..................... 440/80 |
| 6,289,749 B1 | 9/2001 | Sanders |
| 7,930,950 B2 * | 4/2011 | Saito et al. ................. 74/388 PS |
| 2009/0270214 A1 * | 10/2009 | Nowak et al. .................. 475/159 |
| 2013/0105189 A1 * | 5/2013 | Murthy et al. ................ 173/178 |
| 2013/0178331 A1 * | 7/2013 | Saur ................................ 477/15 |

FOREIGN PATENT DOCUMENTS

| | | | |
|---|---|---|---|
| JP | 06254775 A | * | 9/1994 |
| JP | 2005238418 A | * | 9/2005 |

* cited by examiner

*Primary Examiner* — Roger Pang
(74) *Attorney, Agent, or Firm* — Marshall, Gerstein & Borun LLP (57) ABSTRACT

A force transfer apparatus includes a housing, a shaft, a plunger, a retention plate, and a force sensor. The housing defines a cavity and a sidewall with an aperture. The shaft is supported in the cavity for rotation about a first axis that is a longitudinal axis of the shaft. The plunger is disposed in the aperture and has a first and second ends. The first end is operably coupled to the shaft such that the plunger can slide along a second axis that is transverse to the first axis in response to rotation of the shaft. The retention plate is fixed to the sidewall outside of the cavity adjacent to the aperture. The force sensor is disposed between the second end of the plunger and the retention plate. As such, the force sensor can detect the amount of force applied to the plunger by the rotation of the shaft.

20 Claims, 6 Drawing Sheets

ELECTRIC MOTOR TORQUE TRANSFER DEVICE AND SENSOR

FIELD OF THE DISCLOSURE

The present disclosure is directed to force transfer devices and, more particularly, to a force transfer device including a sensor for sensing torque generated by an electric motor actuator.

BACKGROUND

It can be desirable to sense the torque generated by an electric actuator. Some actuators use torque springs to achieve this objective. When torque springs are used, splined shafts are required to allow for sliding of the worm gear, which adds cost. That is, a sliding worm gear requires an expensive geared pinion to transfer rotary movement from the gearbox to the electrical enclosure, where a sensor can measure rotation of the torque pinion. This type of torque sensing system has many moving parts, and can be expensive and less accurate than direct force measurement systems.

Some actuator manufacturers use load cells to measure torque but the load cells are routinely placed in the gearbox or the motor cavity. This placement can be undesirable due to exposure to grease, oil, grime, high temperatures, etc. Placing a sensor directly on the motor shaft or worm shaft also exposes the sensor to harsh conditions, affecting the accuracy and driving up cost. Mounting a sensor on a rotating shaft also requires means to prevent rotation of the sensor, which additionally drives up cost. These locations also require wires to run from the gearbox or motor cavity to the electrical enclosure, making it difficult to maintain a seal between these spaces. This also increases the potential for exposure to electrical interferences to low level analog sensor signals.

SUMMARY

One aspect of the present disclosure provides a force transfer apparatus including a housing, a shaft, a plunger, a retention plate, and a force sensor. The housing defines a cavity and includes a sidewall defining an aperture in communication with the cavity. The shaft is supported in the cavity of the housing for rotation about a first axis. The first axis being a longitudinal axis of the shaft. The plunger is disposed within the aperture of the sidewall of the housing and has a first end and a second end. The first end of the plunger is operably coupled to the shaft such that the plunger is adapted for sliding displacement along a second axis that is transverse to the first axis in response to rotation of the shaft. The retention plate is disposed outside of the cavity and fixed to the sidewall of the housing adjacent to the aperture. The force sensor is disposed outside of the cavity between the second end of the plunger and the retention plate. As such, the force sensor is for detecting the amount of force applied to the plunger by the rotation of the shaft.

DETAILED DESCRIPTION

Figure 1:
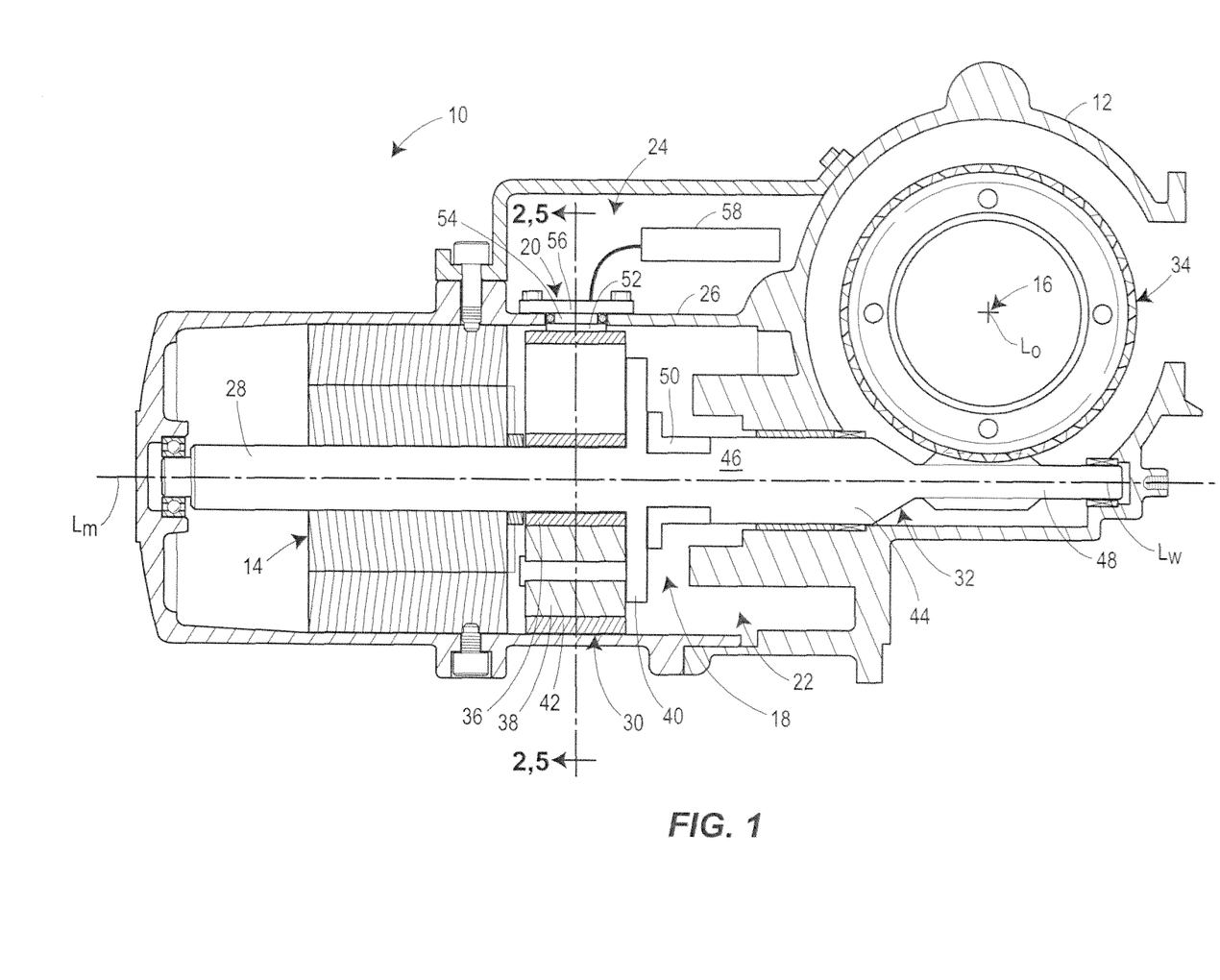
FIG. 1 is a cross-sectional side view of one example of an electric motor actuator constructed in accordance with the principles of the present disclosure.

FIG. 1 is a cross-sectional side view of one example of an electric motor actuator 10 constructed in accordance with the principles of the present disclosure. The actuator 10 includes a housing 12, an electric motor 14, an output shaft 16, a gear set 18, and a force transfer device 20. During operation, the electric motor 14 drives the gear set 18, which in turn drives the rotation of output shaft 16 to deliver rotational torque outside of the actuator 10 to drive a control member of a control valve, a door, a crossing gate, a wind flap, or any other mechanism suitably equipped with an actuator.

Still referring to FIG. 1, the housing 12 of the depicted example is a hollow structure, formed by casting, for example, and includes a gearbox cavity 22, an electrical enclosure 24, and a sidewall 26. The sidewall 26 is disposed between and separates the gearbox cavity 22 from the electrical enclosure 24. The electric motor 14 can include a conventional electric motor 14 mounted in the gearbox cavity 22 and including a motor shaft 28 having a longitudinal axis Lm, about which the motor shaft 28 rotates upon actuation of the electric motor 14. The output shaft 16 of the actuator 10 is operably coupled to the motor shaft 28 and includes a longitudinal axis Lo, about which the output shaft 16 rotates upon actuation of the electric motor 14. In the disclosed example, the longitudinal axis Lo of the output shaft 16 extends transverse to, but does not intersect, the longitudinal axis Lm of the motor shaft 28. Rather, the longitudinal axis Lo of the output shaft 16 is laterally offset from the longitudinal axis Lm of the motor shaft 28.

Figure 2:
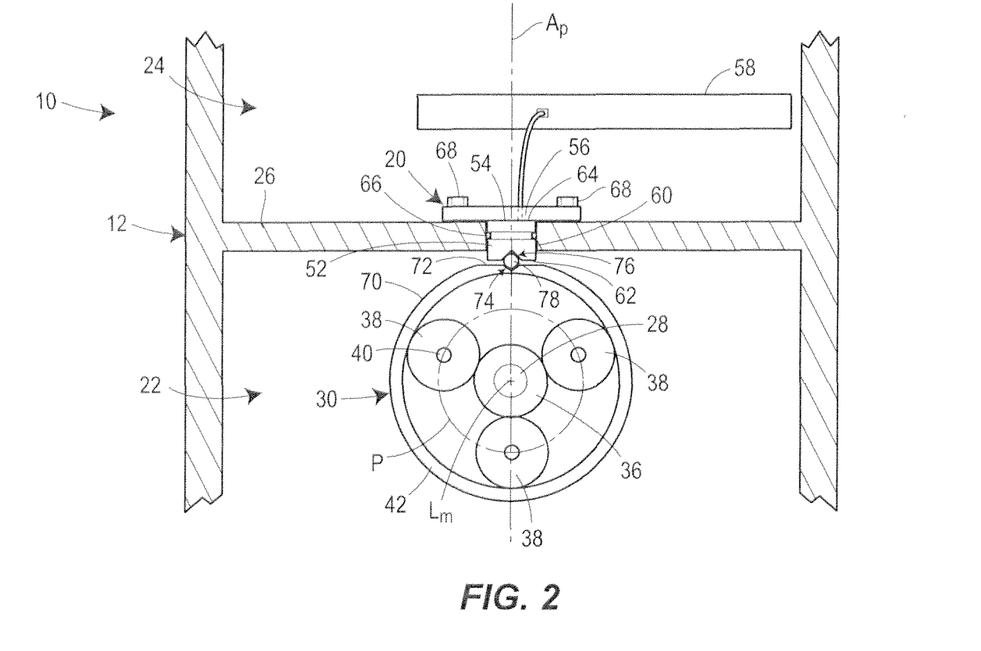
FIG. 2 is a cross-sectional view of the electric motor actuator of FIG. 1 taken through line 2-2 of FIG. 1 as if FIG. 1 were a complete actuator and showing one example of a force transfer device of the present disclosure.

As mentioned, the output shaft 16 is operably coupled to the motor shaft 28 by way of the gear set 18. In the present example, the gear set 18 includes a planetary gear set 30, a worm gear 32, and a worm wheel 34. The planetary gear set 30 is adapted to reduce the angular velocity of the worm gear 32 relative to the angular velocity of the motor shaft 28 of the electric motor 14. As depicted in FIGS. 1 and 2, the planetary gear set 30 includes a sun gear 36, a plurality of planet gears 38 connected by a planet carrier 40, and a ring gear 42. The sun gear 36 is fixed to the motor shaft 29 of the electric motor 14. The plurality of planet gears 38 in this example includes three planet gears 38 in meshing engagement with the sun gear 36. The ring gear 42 is disposed about and in meshing engagement with the planet gears 38. The worm gear 32 includes an elongated shaft 44 having a longitudinal axis Lw, around which it rotates, and includes a coupling end 46 and a toothed end 48. In the disclosed example, the longitudinal axis Lw of the worm gear 32 is coincident with the longitudinal axis Lm of the motor shaft 28, but other operational configurations are intended to be included within the scope of the present disclosure. The coupling end 46 is coupled to the planet carrier 40 via a sleeve 50 that is fastened to the planet carrier 40 by fasteners, welding, or some other suitable means. An attachment mechanism other than the sleeve 50 can be used.

The toothed end 48 of the worm gear 32 is disposed in meshing engagement with the worm wheel 34, which is coupled to the output shaft 16 of the actuator 10. The worm wheel 34 can be directly coupled to the output shaft 16 or can be coupled to the output shaft 16 via a clutch mechanism, for example, or some other means. So configured, upon actuation of the electric motor 14, the motor shaft 28 rotates, which in turn, rotates the sun gear 36. Rotation of the sun gear 36 causes rotation of the planet gears 38 about their respective axes. The ring gear 42 of the present example is relatively fixed against rotation relative to the housing 12 of the actuator 10, as will be described, and as such, the planet gears 38 also travel along a circular path P (shown in FIG. 2) around the sun gear 36 in a conventional manner. This circular travel of the planet gears 38 causes the planet carrier 40 to rotate about the longitudinal axis Lm of the motor shaft 28, which in turn, rotates the work gear 32 about the longitudinal axis Lw of the worm gear 32. Rotation of the worm gear 32 about the longitudinal axis Lw thereof meshes with and causes the worm wheel 34 and output shaft 16 of the actuator 10 to rotate about the longitudinal axis Lo of the output shaft 16.

Still referring to FIGS. 1 and 2, the force transfer device 20 of the present example of the actuator 10 includes a plunger 52, a force sensor 54, a retention plate 56, and an electronic controller 58. As depicted in FIG. 2, the plunger 52 is disposed within an aperture 60 of the sidewall 26 of the housing 12 of the actuator 10 and includes a generally cylindrical member having a first end 62 and a second end 64. Additionally, in the disclosed example, the plunger includes an o-ring 66 disposed around a mid-portion thereof to provide a seal between the plunger 52 and the sidewall 26 in the aperture 60. The retention plate 56 of the disclosed example is disposed inside of the electrical enclosure 24 of the housing 12 and fixed to the sidewall 26 with at least a pair of fasteners 68 such as bolts, for example. The force sensor 54 is disposed between the second end 64 of the plunger 52 and the retention plate 56. Additionally, the force sensor 54 is disposed opposite the gearbox cavity 22 of the housing 12 from the o-ring 66, thereby ensuring that the force sensor 54 is sealed from any dirt and grease that may be disposed in the gearbox cavity 22. The force sensor 54 can include any suitable force sensor including, for example, a strain gauge, piezo-electric sensor, piezo-resistive sensor, a resistive sensor, or any other suitable sensor. One example of a force sensor 54 can include a resistive force sensor called FlexiForce®, manufactured by Tekscan, Inc.

Figure 3:
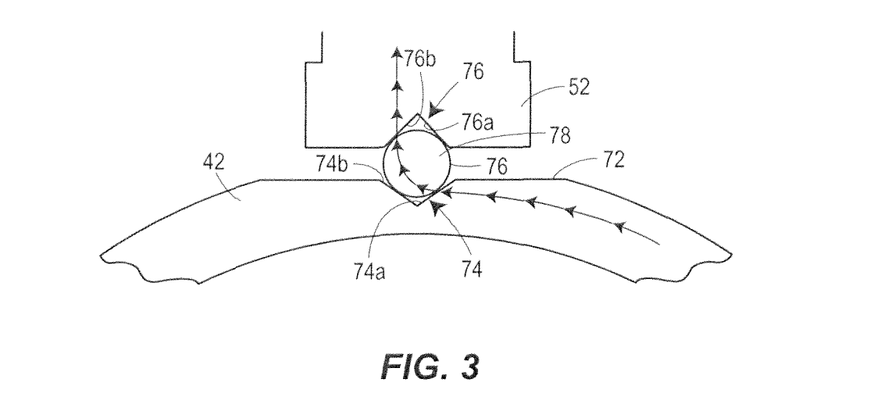
FIG. 3 is a partial detail view of FIG. 2.

Referring to FIG. 2, and as mentioned above, the first end 62 of the plunger 52 is operably coupled to the ring gear 42 of the planetary gear set 30 such that rotational torque supplied by the motor shaft 28 about the longitudinal axis Lm of the motor shaft 28 is ultimately transferred to a linear load applied to the plunger 52 along a plunger axis Ap of the plunger 52. In the disclosed example, the axis Ap of the plunger 52 extends transverse to, and intersects, the longitudinal axis Lm of the motor shaft 28. As depicted, the plunger axis Ap of the plunger 52 is perpendicular to the longitudinal axis Lm of the motor shaft 28. More specifically, in the disclosed example, an outer surface 70 of the ring gear 42 can include a flattened portion 72 disposed proximate to the first end 62 of the plunger 52. Moreover, the flattened portion 72 of the ring gear 42 and the first end 62 of the plunger 52 can include V-shaped recesses 74, 76, respectively. As shown in FIG. 3, each V-shaped recess 74, 76 includes a first angled surface 74a, 76a and an opposing and intersection second angled surface 74b, 76b. A bearing 78 is received between the recesses 74, 76 for transferring force from the ring gear 42 to the plunger 52, as will be described. In the present example, the V-shaped recesses 74, 76 can include elongated V-shaped grooves and the bearing 78 can include a cylindrical roller bearing. The V-shaped grooves 74, 76 and the cylindrical bearing 78 can extend along their respective longitudinal axes, which are disposed parallel to the longitudinal axis Lm of the motor shaft 28 of the electric motor 14, and therefore, perpendicular to the plunger axis Ap of the plunger 52.

So configured, and as mentioned, rotation of the motor shaft 28 about the longitudinal axis Lm of the motor shaft 28 generates a rotational torque about the longitudinal axis Lm of the motor shaft 28 and applied to the ring gear 42, via the sun and planet gears 36, 38, which is then transferred into a linear force applied to the plunger 52 along the plunger axis Ap. More specifically, as the motor shaft 28 rotates, the plant gears 38 are rotated and moved along the circular path P inside of the ring gear 42. The ring gear 42 is held substantially in the position depicted in FIG. 2 due to presence of the bearing 78 in the V-shaped recesses 74, 76. That is, with reference to FIG. 2, for example, as the motor shaft 28 rotates clockwise, each of the planet gears 38 rotates counter-clockwise about their respective shafts, which causes them to travel in the clockwise direction along the path P because the ring gear 42 is fixed against rotation. This movement, however, applies a torque to the ring gear 42 in the counter-clockwise direction. As shown with arrows in FIG. 3, this counter-clockwise torque applied to the ring gear 42 urges the first angled surface 74a of the V-shaped recess 74 in the ring gear 42 into the bearing 78, which in turn, urges the bearing 78 into the second angled surface 76b of the V-shaped recess 76 in the plunger 52 such that the plunger 52 is urged upward along the plunger axis Ap. With the plunger 52 being urged upward, the second surface 64 of the plunger 52 applies a force against the force sensor 54, thereby compressing the force sensor 54 between the plunger 52 and the retention plate 56. The force sensor 54 is electrically connected to the electronic controller 58, which then performs an algorithm to determine the torque applied by the motor shaft 28 in real-time.

Figure 4:
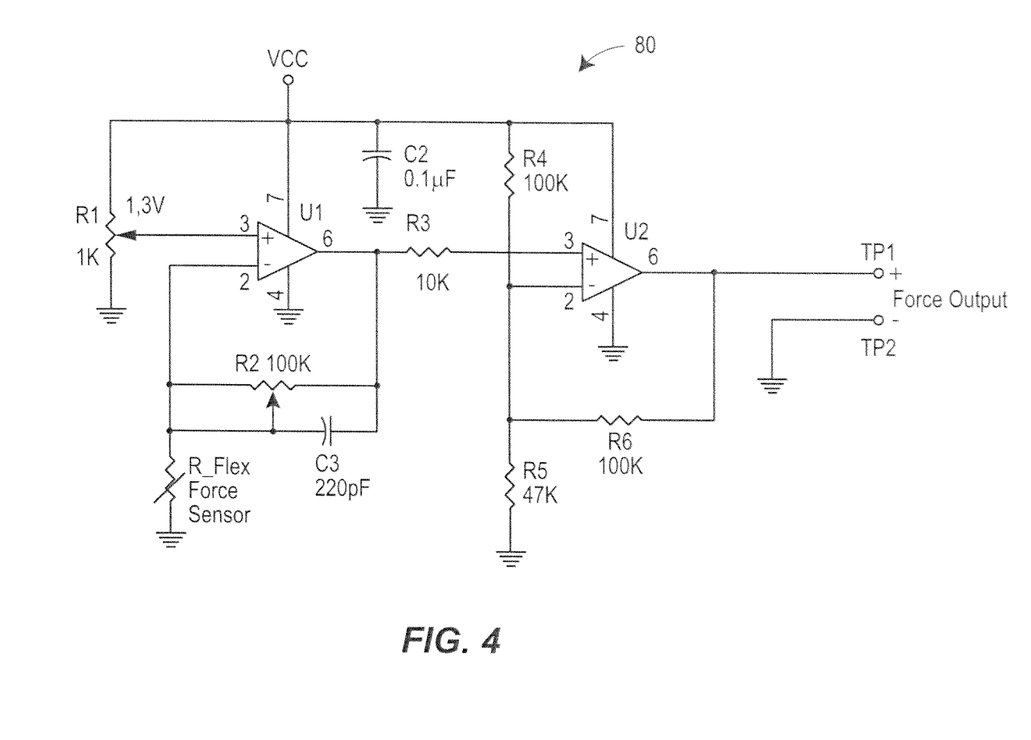
FIG. 4 is a schematic diagram of one version of an electrical circuit for converting sensing force in accordance with the example electric motor actuator of FIG. 1.

FIG. 4 depicts one version of an electrical circuit 80 of the electronic controller 58 that has been adjusted for an output of 0-5 V and which can be connected to a data acquisition system, for example. As depicted, the circuit 80 includes, in part, a first resistor R1, a second resistor R2, a first amplifier U1, a second amplifier U2, and fifth resistor R5. The first resistor R1 sets current in the force sensor 54 and generates an offset, setting the force range. The second resistor sets the gain of the first amplifier U1, which can be an op-amp. The second amplifier U2, which can also be an op-amp, removes the offset generated by the first resistor R1 and adds gain to the output signal. The fifth resistor R5 sets the gain of the second amplifier U2. This arrangement of the second amplifier U2 allows the first amplifier U1 to advantageously operate at a much lower gain, thereby improving sensor linearity.

It should be appreciated that the force transfer device 20 of the presently disclosed example is bi-directional in that regardless of whether the motor shaft 28 is rotated clockwise or counter-clockwise relative to the orientation depicted in FIG. 2, the opposing angled surfaces 74a, 74b, 76a, 76b of the V-shaped recesses 74, 76 are capable of transferring the load to the force sensor 54 via the bearing 78 and the plunger 52 in the manner described. Additionally, this bi-directional operability using only a single sensor is highly advantageous.

Figure 5:
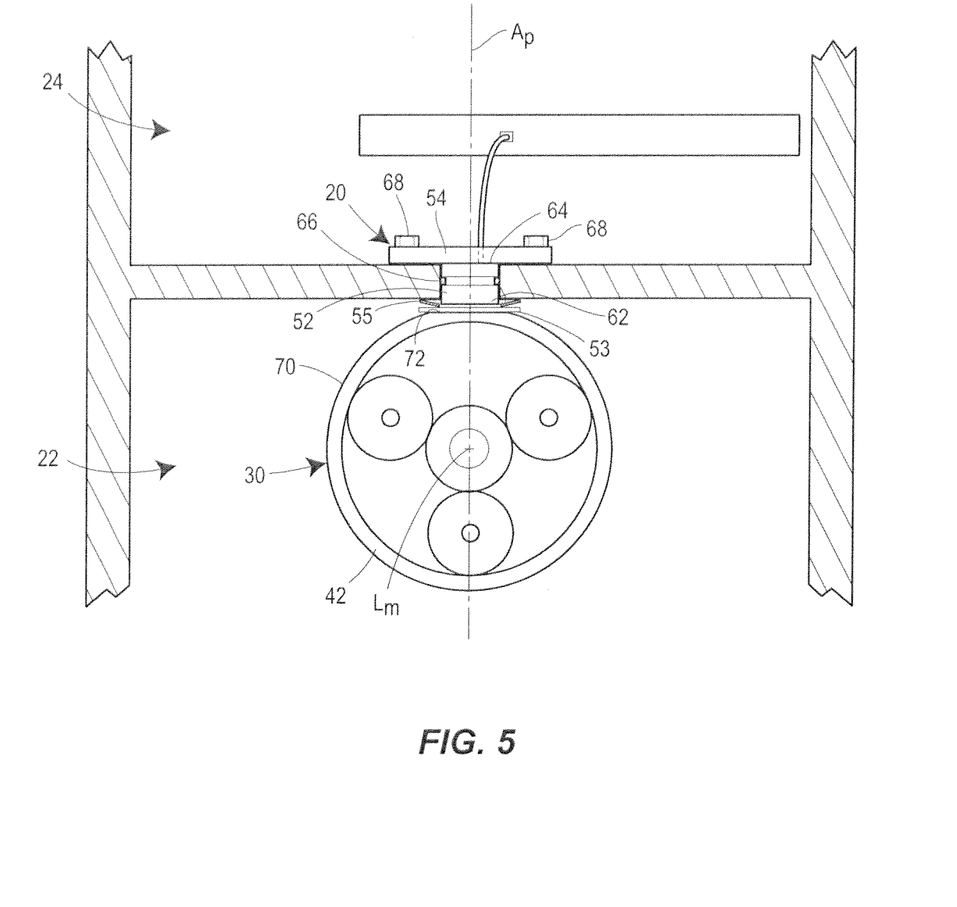
FIG. 5 is a cross-sectional view of the electric motor actuator of FIG. 1 taken through line 5-5 of FIG. 1 as if FIG. 1 were a complete actuator and showing an alternative example of a force transfer device of the present disclosure.

While the example force transfer device 20 described with reference to FIGS. 1-4 includes V-shaped recesses 74, 76 and a bearing 78 for transferring the load from the ring gear 42 to the plunger 52, this is merely an example, and other constructs are intended to be within the present disclosure. For example, FIG. 5 depicts an alternative example of a force transfer device 20 that does not include V-shaped recesses or a bearing between the ring gear 42 and the plunger 52. Instead, the first end 62 of the plunger 52 includes a cap portion 53 disposed in the gearbox cavity 22 and directly contacting the flattened portion 72 on the outer surface 70 of the ring gear 42.

So configured, torque applied to the ring gear 42 by the motor shaft 28, sun gear 36, and planet gears 38, is applied directly to the cap portion 53 to urge the plunger 52 upward along the plunger axis Ap relative to the orientation of FIG. 5 and against the force sensor 54. In addition to the cap portion 53, an example of the force transfer device 20 of FIG. 5 can include a biasing member 55 disposed in the gearbox cavity 22 between the cap portion 53 and the sidewall 26 of the housing 12 adjacent to the aperture 60 accommodating the plunger 52. The biasing member 55 is for biasing or urging the plunger 52 away from the force sensor 54 and toward the ring gear 42. This can be advantageous because when the plunger 52 is urged upward in the aperture 60 by the ring gear 42, friction between the o-ring 66 and the aperture 60 can retain the plunger 52 in the raised position. In the disclosed example, the biasing member 55 can include a wave spring, a coil spring, a washer constructed of resilient rubber or foam, for example, or any other suitable biasing member. Although the example force transfer device 20 described above with reference to FIGS. 2 and 3 did not expressly include a similar biasing member, an alternative example of that device 20 could include any one of the biasing members described with reference to FIG. 5.

Figure 6:
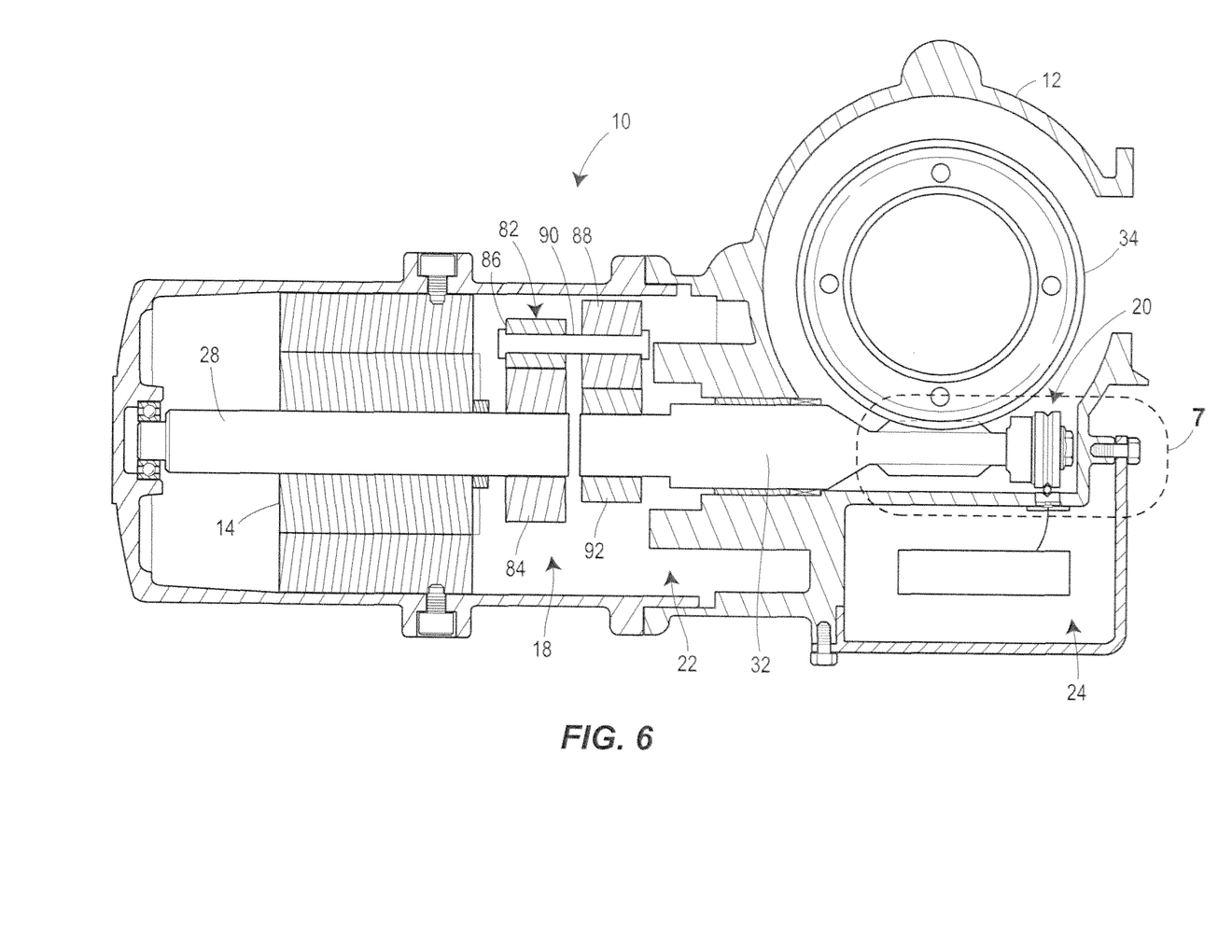
FIG. 6 is a cross-sectional side view of an alternative example of an electric motor actuator constructed in accordance with the principles of the present disclosure.

While the foregoing examples of the actuator 10 have included a gear set 18 including a planetary gear set 30 operably coupled to the force transfer device 20, another example of the present disclosure can include the force transfer device 20 operably coupled to the worm gear 32 of the gear set 18. FIG. 6 discloses one such example of an alternative actuator 10 that is constructed similar to the actuator 10 described above, with the exception of the details of the gear set 18 and the location of the force transfer device 20 and the electrical enclosure 24.

More specifically, the gear set 18 of the actuator 10 of FIG. 6 includes a set of spur gears 82, the worm gear 32, and the worm wheel 34. The worm gear 32 and worm wheel 34 can be identical to those described above. The spur gears 82, however, are incorporated instead of the planetary gear set 30 described above, and include a first gear 84 attached to the motor shaft 28, second and third gears 86, 88 carried by a common side shaft 90, and a fourth gear 92 attached to the worm gear 32. The first gear 84 meshes with the second gear 86, which in turn drives the third gear 88, which meshes with and drives the fourth gear 92 and the worm gear 32. The second and third gears 86, 88 of the disclosed embodiment are reduction gears to reduce the angular velocity of the worm gear 32 relative to angular velocity of the motor shaft 28.

Figure 7:
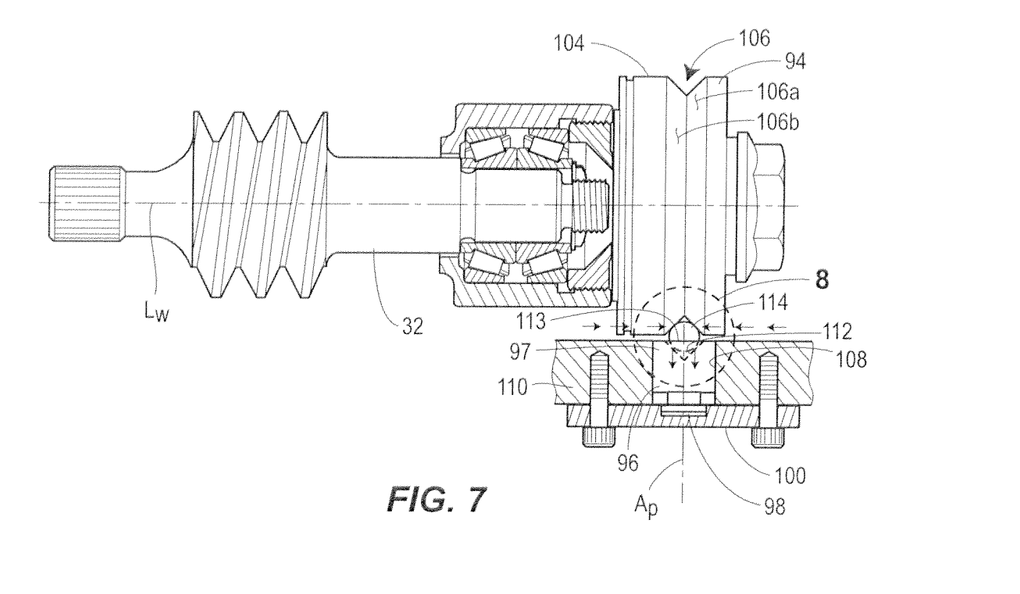
FIG. 7 is a partial detail view taken from the area encompassed by line 7 of FIG. 6.

As shown in FIG. 6, the force transfer device 20 of the present example is partially carried directly by the worm gear 32 at a location opposite the electric motor 14 and is rotatable about a longitudinal axis Lw of the worm gear 32. As shown in FIG. 7, the force transfer device 20 of the present example includes a thrust ring 94, a plunger 96, a force sensor 98, and a retention plate 100. As is also depicted in FIG. 7, an end of the worm gear 32 adjacent to the force transfer device 20 is rotatably supported in a bearing assembly 102 and affixed to the thrust ring 94. The thrust ring 94 includes an annular disc with an outer circumferential surface 104 having an annular V-shaped recess 106 formed therein. The V-shaped recess 106 in the thrust ring 94 includes opposing first and second angled surfaces 106a, 106b.

Similar to previous examples, the plunger 96 of the present example includes a cylindrical shaped member having first and second ends 97, 99 and being disposed within an aperture 108 in a sidewall 110 of the housing 12 that separates the gearbox cavity 22 from the electrical enclosure 24. So disposed, the plunger 96 is slidable along a plunger axis Ap in response actuation of the electric motor 14, as will be described. Same as above, the plunger axis Ap is disposed transverse to the longitudinal axis Lm of the motor shaft 28 and the longitudinal axis Lw of the worm gear 32. Moreover, in the disclosed example, the plunger axis Ap intersects and is perpendicular to the longitudinal axis Lm of the motor shaft 28 and the longitudinal axis Lw of the worm gear 32, which can be coincident with one another. Identical to that described above with previous examples, the retention plate 100 of the example depicted in FIG. 7 is disposed in the electrical enclosure 24 and fixed to the sidewall 110 such that the force sensor 98 is disposed between the retention plate 100 and the second end 99 of the plunger 96 such that the force sensor 98 becomes compressed between the plunger 96 and the retention plate 100 during operation. Moreover, the first end of the plunger 96 includes a V-shaped recess 112 formed therein. The V-shaped recess 112 in the plunger 96 of the present example can include a conical recess having a continuous conical surface 113. The recess 112 partially receives a ball bearing 114, which is also partially received within the V-shaped recess 106 of the thrust ring 94 carried by the worm gear 32.

So configured, the force transfer device 20 of the example depicted in FIG. 7 is adapted to convert bi-directional reactant forces applied to the worm gear 32 through meshing engagement with the worm wheel 34, into linear forces applied to the plunger 96 along the plunger axis Ap. Sufficient for causes the plunger 96 to compress the force sensor 98. More specifically, as the motor shaft 28 rotates, thereby driving the spur gears 82, the worm gear 32 rotates about its longitudinal axis Lw. As the worm gear 32 meshes with the worm wheel 34, the worm gear 32 experiences reactant forces that urge the worm gear 32 in an axial direction along its longitudinal axis Lw. Depending on the direction of rotation, the reactant forces may urge the worm gear 32 toward or away from the force transfer device 20.

Figure 8:
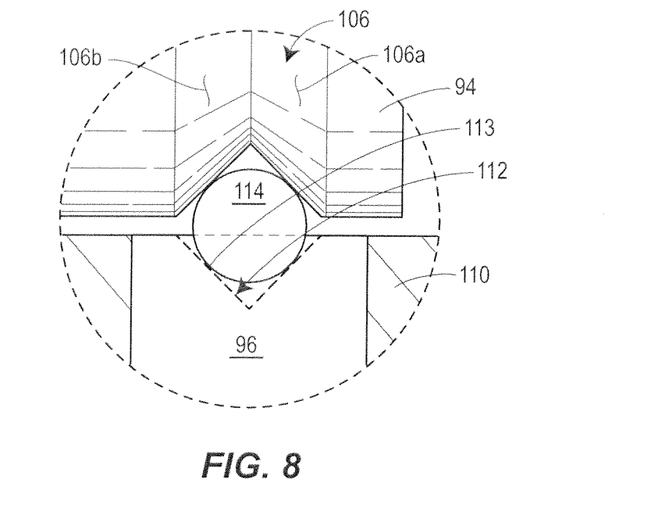
FIG. 8 is a partial detail view taken from fro the area encompassed by circle 8 of FIG. 7.

For the sake of description, and as indicated with arrows in FIG. 7, a reactant force urging the worm gear 32 toward the force transfer device 20 causes the second angled surface 106b of the V-shaped recess 106 of the thrust ring 94 to urge the bearing 114 into forceful engagement with the conical surface 113 of the V-shaped recess 112 of the plunger 96, as shown in FIG. 7. This engagement causes the plunger 96 to move down along the plunger axis Ap relative to the orientation of FIGS. 7 and 8. It should be appreciated that a reactant force urging the worm gear 32 away from the force transfer device 20 would function similarly, although the first angular surface 106a of the V-shaped recess 106 of the thrust ring 94, instead of the second angular surface 106b, would urge the bearing 114 into the conical surface 113 of the V-shaped recess 112 for moving the plunger 96 and compressing the force sensor 98.

Based on the foregoing description, it should be appreciated that the present disclosure provides a unique torque measurement and force transfer apparatus that advantageously requires only a single force sensor for sensing torque generated by an electric actuator output shaft. This results in a more cost effective actuator.

Moreover, the present disclosure advantageously locates the force sensor outside of the gearbox cavity of the actuator, where oil, grease, heat, and dirt can easily damage such a sensor. Instead, the force sensor is located in an electronic enclosure and is sealed from the harsh gearbox environment. This results in a reliable actuator with a long useful life and an electronic component that is easily serviceable, when service is required.

Furthermore, the disclosed actuators advantageously provide for the real-time sensing and monitoring of torque feedback for valve operation and diagnostics based on changes in valve characteristics such as wearing of components, degradation of lubrication, etc.

While various examples have been described, each potentially including distinct components, etc., it should be appreciated that different components of different examples are intended to be interchanged and combined such that the disclosure as a whole, would be understood by a person having ordinary skill in the art, to include any combination of any of the features described herein or depicted in the figures.

The foregoing description provides numerous examples of actuators and force transfer devices and other apparatuses, but the scope of the invention is not intended to be limited by the descriptive examples. Rather, the scope of the invention is to include all which is encompassed by the spirit and scope of the following claims.

What is claimed is:

1. A force transfer apparatus, comprising:
a housing defining a cavity and including a sidewall defining an aperture in communication with the cavity;
a shaft supported in the cavity of the housing for rotation about a first axis, the first axis being a longitudinal axis of the shaft;
a plunger disposed within the aperture of the sidewall of the housing, the plunger having a first end and a second end, the first end of the plunger operably coupled to the shaft such that the plunger is adapted for sliding displacement along a second axis that is transverse to the first axis in response to rotation of the shaft;
a retention plate disposed outside of the cavity and fixed to the sidewall of the housing adjacent to the aperture;
a force sensor disposed outside of the cavity between the second end of the plunger and the retention plate, the force sensor for detecting the amount of force applied to the plunger by the rotation of the shaft;
a gear set disposed between and operably coupling the shaft to the plunger, wherein the gear set comprises a planetary gear set including a sun gear fixed to the shaft, at least one planet gear meshing with the sun gear, and a ring gear meshing with the planet gear; and
a bearing disposed within opposing first and second V-shaped recesses formed in a portion of the gear set and the first end of the plunger, respectively,
wherein the first end of the plunger is operably connected to an outer surface of the ring gear such that a rotational force applied to the ring gear about the first axis results in a linear force being applied to the plunger along the second axis, and wherein the outer surface of the ring gear includes a flat portion in which the first V-shaped recess is defined.

2. The apparatus of claim 1, wherein the V-shaped recesses each include elongated grooves.

3. The apparatus of claim 2, wherein the bearing includes a cylindrical roller bearing.

4. The apparatus of claim 3, wherein the V-shaped grooves and the cylindrical roller bearing extend along respective longitudinal axes that are parallel to the first axis of the shaft and perpendicular to the second axis of the plunger.

5. The apparatus of claim 1, further comprising a seal disposed between the plunger and the sidewall in the aperture.

6. The apparatus of claim 5, wherein the force sensor is disposed opposite the cavity from the seal, thereby ensuring that the force sensor is sealed from any dirt and grease in the cavity.

7. An actuator, comprising:
a housing comprising a gearbox cavity, an electrical enclosure, and a sidewall disposed between the gearbox cavity and the electrical enclosure, the sidewall defining an aperture providing communication between the gearbox cavity and the electrical enclosure;
an electric motor disposed within the gearbox cavity and including a motor shaft rotatably disposed about a first axis, the first axis being a longitudinal axis of the motor shaft;
an output shaft operably coupled to the electric motor for delivering rotational torque outside of the housing;
a plunger disposed within the aperture of the sidewall, the plunger having a first end and a second end and adapted for sliding displacement along a second axis that is transverse to the first axis in response to rotation of the motor shaft, the first end of the plunger disposed toward the gearbox cavity and the second end disposed toward the electrical enclosure;
a gear set at least partially disposed within the cavity and operably coupling the motor shaft of the electric motor to the first end of the plunger and to the output shaft, wherein the gear set comprises a planetary gear set including a sun gear fixed to the motor shaft of the electric motor, at least one planet gear meshing with the sun gear, and a ring gear meshing with the planet gear;
a bearing disposed within opposing first and second V-shaped recesses formed in a portion of the gear set and the first end of the plunger, respectively,
wherein the first end of the plunger is operably connected to an outer surface of the ring gear such that a rotational force applied to the ring gear about the first axis results in a linear force being applied to the plunger along the second axis, wherein the outer surface of the ring gear includes a flat portion in which the first V-shaped recess is defined;
a retention plate disposed in the electrical enclosure and fixed to the sidewall of the housing; and
a force sensor disposed between the second end of the plunger and the retention plate, the force sensor for detecting a force applied to the plunger by the rotation of the motor shaft.

8. The actuator of claim 7, wherein the V-shaped recesses each include elongated grooves.

9. The actuator of claim 8, wherein the bearing includes a cylindrical roller bearing.

10. The actuator of claim 9, wherein the V-shaped grooves and the cylindrical roller bearing extend along respective longitudinal axes that are parallel to the first axis of the shaft and perpendicular to the second axis of the plunger.

11. The actuator of claim 7, further comprising a seal disposed between the plunger and the sidewall in the aperture.

12. The actuator of claim 11, wherein the force sensor is disposed opposite the gearbox cavity from the seal, thereby ensuring that the force sensor is sealed from any dirt and grease in the gearbox cavity.

13. The actuator of claim 8, further comprising an electronic controller disposed in the electrical enclosure and electrically connected to the force sensor, the electronic controller configured to perform an algorithm to determine the torque applied to the motor shaft based on compression of the force sensor.

14. The actuator of claim 7, further comprising:
- a planet carrier carrying the at least one planet gear;
- a worm gear coupled to the planet carrier for rotation with the planet carrier;
- a worm wheel meshing with the worm gear; and
- an output shaft rotatably coupled to the worm wheel for delivering rotational torque outside of the actuator.

15. An electric actuator, comprising:
- a housing comprising a gearbox cavity, an electrical enclosure, and a sidewall disposed between the gearbox cavity and the electrical enclosure, the sidewall defining an aperture providing communication between the gearbox cavity and the electrical enclosure;
- an electric motor disposed within the gearbox cavity and including a motor shaft rotatably disposed about a first axis, the first axis being a longitudinal axis of the motor shaft;
- a planetary gear set disposed within the gearbox cavity, the planetary gear set including a sun gear fixed to the motor shaft of the electric motor, at least one planet gear carried by a planet carrier and meshing with the sun gear, and a ring gear meshing with the at least one planet gear;
- a worm gear coupled to the planet carrier for rotation with the planet carrier;
- a worm wheel meshing with the worm gear;
- an output shaft rotatably coupled to the worm wheel for delivering rotational torque outside of the actuator;
- a plunger disposed within the aperture of the sidewall, the plunger having a first end and a second end and adapted for sliding displacement along a second axis that is transverse to the first axis, the first end of the plunger being operably coupled to an outer surface of the ring gear such that rotational torque applied to the ring gear about the first axis by the motor shaft of the electric motor is transferred into a linear force applied to the plunger along the second axis;
- a bearing disposed within opposing first and second V-shaped recesses formed in the outer surface of the ring gear and the first end of the plunger, respectively, wherein the outer surface of the ring gear includes a flat portion in which the first V-shaped recess is defined;
- a retention plate disposed in the electrical enclosure and fixed to the sidewall of the housing; and
- a force sensor disposed between the second end of the plunger and the retention plate, the force sensor for detecting a force applied to the plunger by the rotation of the motor shaft.

16. The actuator of claim 15, wherein the bearing includes a cylindrical roller bearing.

17. The actuator of claim 16, wherein the V-shaped grooves and the cylindrical roller bearing extend along respective longitudinal axes that are parallel to the first axis of the shaft and perpendicular to the second axis of the plunger.

18. The actuator of claim 15, further comprising a seal disposed between the plunger and the sidewall in the aperture.

19. The actuator of claim 18, wherein the force sensor is disposed opposite the gearbox cavity from the seal, thereby ensuring that the force sensor is sealed from any dirt and grease in the gearbox cavity.

20. The actuator of claim 15, further comprising an electronic controller disposed in the electrical enclosure and electrically connected to the force sensor, the electronic controller configured to perform an algorithm to determine the torque applied to the motor shaft based on the compression of the force sensor.

* * * * *

UNITED STATES PATENT AND TRADEMARK OFFICE
CERTIFICATE OF CORRECTION

PATENT NO. : 8,905,895 B2  Page 1 of 1
APPLICATION NO. : 13/517843
DATED : December 9, 2014
INVENTOR(S) : Gerald W. Scalf et al.

It is certified that error appears in the above-identified patent and that said Letters Patent is hereby corrected as shown below:

On the Title Page:

At item (73), line 1, "Value" should be -- Valve --.

In the Specification:

At Column 2, line 13, "from fro" should be -- from --.

At Column 4, line 17, "plant" should be -- planet --.

Signed and Sealed this
Twenty-third Day of February, 2016

Michelle K. Lee
*Director of the United States Patent and Trademark Office*